3,115,503
STABILIZED CYCLIC ANHYDRIDES
William G. Bowman, Pasadena, Tex., assignor to Petro-Tex Chemical Corporation, Houston, Tex., a corporation of Delaware
No Drawing. Filed Sept. 12, 1962, Ser. No. 223,235
7 Claims. (Cl. 260—346.8)

This invention relates to new compositions of matter and particularly to new and useful compositions of cyclic anhydrides of dibasic acids. More specifically, this invention relates to color stabilized cyclic anhydrides of dibasic acids particularly when in a molten state.

Cyclic anhydrides of certain dibasic acids are available to the consumer in either solid or molten form. Although cyclic anhydrides are classified as chemically stable compounds, some discoloration of the solid material may be detected when allowed to stand over extended periods of time. This rate of discoloration is more pronounced when the solid cyclic anhydrides are reduced to their molten form and particularly when maintained in their molten state for extended periods of time.

Although this invention is directed to stabilized cyclic anhydrides of dibasic acids containing at least four carbon atoms, it is more specifically directed to stabilized phthalic anhydride, stabilized maleic anhydride, and stabilized derivatives of maleic anhydride such as succinic anhydride, tetrahydrophthalic anhydride, hexahydrophthalic anhydride, and the like. Although this invention is not limited to either the solid or molten forms of the cyclic anhydrides, it is particularly advantageous in stabilizing molten cyclic anhydrides because of their increased rate of discoloration. Up to now, this increased rate of discoloration offset the economic advantages that could be gained by shipping and storing cyclic anhydrides in the molten state.

It is therefore an object of this invention to provide stabilized cyclic anhydrides. Another object of this invention is to provide cyclic anhydrides that will not discolor at elevated temperatures over extended periods of time. Another object of this invention is to provide color stabilized molten maleic anhydride and derivatives thereof derived from $C_4$ hydrocarbons. Still another object of this invention is to provide a process which will provide stabilized cyclic anhydrides at elevated temperatures for prolonged periods of time. Other objects and advantages of this invention will be apparent from the disclosure which follows.

It was unexpectedly found that these objects were accomplished by incorporating into cyclic anhydrides small amounts of ethlyene diaminetetraacetic acid. The amounts of ethylenediaminetetraacetic acid required may be varied depending, to some extent, on whether the particular cyclic anhydride is in molten or solid form and the length of time the cyclic anhydride is to be maintained in either form. Generally the amounts of ethylenediaminetetraacetic required to stabilize solid cyclic anhydrides will be less than that required to stabilize molten cyclic anhydrides. Usually the amount of ethylenediaminetetraacetic acid required will be greater than 0.0005 percent by weight of the cyclic anhydride and usually less than about 1.0 percent by weight of the cyclic anhydride, although larger amounts, while not necessary, may be used. Amounts of ethylenediaminetetraacetic acid bewteen about 0.001 percent and 0.1 percent by weight of the cyclic anhydride are preferred. In preparing a color stabilized maleic anhydride, which is to be maintained in a molten state over an extended period of time, about 0.01 weight percent of ethylenediaminetetraacetic acid based on the weight of the cyclic anhydride is sufficient to maintain the molten maleic anhydride at a Hazen color[1] of below 20. In color stabilizing solid maleic anhydride, an amount substantially less than 0.01 weight percent of ethylenediaminetetraacetic acid based on the weight of maleic anhydride is sufficient to inhibit the formation of yellow-brown specks that have been detected in some solidified maleic anhydrides.

The ethylenediaminetetraacetic acid is generally added to the cyclic anhydride as a solid rather than as a solution of ethylenediaminetetraacetic acid. To insure that the ethylenediaminetetraacetic acid is well dispersed throughout the cyclic anhydride, the solid ethylenediaminetetraacetic acid is preferably added to molten cyclic anhydride during the preparation process or thereafter; however, the ethylenediaminetetraacetic acid may be added to the finely divided solid cyclic anhydride prior to compressing the solid cyclic anhydride into tablets or briquettes. Although the effectiveness of ethylenediaminetetraacetic acid as a color stabilizer is generally determined by the conditions surrounding its use and by the quantity of ethylenediaminetetraacetic acid incorporated in the cyclic anhydride, there are certain handling techniques which may further increase the ethylenediaminetetraacetic acid's effectiveness. For example, the life and effectiveness of ethylenediaminetetaraacetic acid may be prolonged by shipping or storing the cyclic anhydride in an inert atmosphere. One way in which this may be accomplished is by purging the vapor space above the cyclic anhydride with a dry inert gas or material substantially inert to the cyclic anhydride and by maintaining the cyclic anhydride, while in transit or storage, under a positive pressure with an inert gas. This technique is particularly useful when the cyclic anhydrides are shipped or stored in molten form. Suitable inert gases, or substantially inert materials that may be employed include nitrogen, helium, carbon dioxide, methane, and the like.

In the following example the maleic anhydride used was prepared by vapor phase oxidation of butylenes. The preparation of maleic acid from butylene is described in an article by W. A. Skinner and Dale Tieszen in Industrial and Engineering Chemistry (1961), volume 53, pages 557 and 558. The maleic acid is readily converted to maleic anhydride by conventional dehydration. Some discoloration has been noted in maleic anhydride, produced by the air oxidation of butylenes, when such maleic anhydride is maintained in a molten state.

The color value of the molten maleic anhydride was determined by placing molten maleic anhydride into a 100 ml. tall form Nessler tube and comparing the color of the molten maleic anhydride with APHA color standards using a matte white background in diffused daylight, or the equivalent. Color standard preparations are discussed on page 629 of the Official Agricultural Chemists, sixth edition, 1945. Color values are reported as Hazen colors and were determined on a color Nesslerimeter supplied by Fisher Scientific Company.

Two Nessler tubes were filled with 100 ml. of molten maleic anhydride, derived from butene, at a temperature of about 60° C. One of the tubes was designated as the control and contained only molten maleic anhydride. The second tube contained molten maleic anhydride and 0.01 weight percent of ethylenediaminetetraacetic acid, based on the weight of the maleic anhydride, dissolved therein. Both tubes were capped with ground glass covers and placed in a hot oil bath maintained at a temperature of 100° C. Initially, the molten maleic anhydride of both samples had a Hazen color of less than 10. After 96 hours in a hot oil bath maintained at a temperature of 100° C. the Hazen color of the molten maleic anhydride in ---
[1] Hazen colors are determined by platinum-cobalt color standards. A description of the procedure is given by W. W. Scott in "Standard Methods of Chemical Analysis," D. Van Nostrand Co., Inc., fifth edition, vol. 2, p. 2048.

the control tube was greater than 50 while the tube containing the molten maleic anhydride and the ethylenediaminetetraacetic acid had a Hazen color of only 25.

The procedure outlined above was repeated with another sample of maleic anhydride with the exception that the temperature of the hot oil bath was maintained at 60° C. which is in the range used to maintain maleic anhydride molten in tank car shipments. Initially the molten maleic anhydrides had a Hazen color of less than 10. After 3 weeks in a hot oil bath maintained at a temperature of about 60° C. the molten maleic anhydride in the control tube had a Hazen color above 25 while the molten maleic anhydride containing 0.01 weight percent of ethylenediaminetetraacetic acid had a Hazen color well below 20. The discoloration is believed to be caused by organic impurities.

The above tests are repeated with phthalic anhydride, and cyclic anhydrides derived from maleic anhydride including tetrahydrophthalic anhydride, hexahydrophthalic anhydride, succinic anhydride, and mixtures thereof, at an oil bath temperature sufficient to maintain the cycle anhydrides in molten form. The cyclic anhydrides containing about 0.01 weight percent of ethylenediaminetetraacetic acid had Hazen color values well below those of the controls even after prolonged exposure at the elevated temperatures. Similarly, samples of solid maleic anhydride containing about 0.01 weight percent of ethylenediaminetetraacetic acid showed no tendency to develop yellow-brown specks after extended storage.

Cyclic anhydrides and in particular maleic anhydride are useful in producing polyesters, maleic modified alkyds for paints, copolymer resins, and for many other purposes including ion exchange resins and the like. Color free reactants are required in many applications.

I claim:

1. A color stabilized composition of matter comprising a cyclic anhydride of a dibasic acid selected from the group consisting of maleic anhydride, phthalic anhydride, succinic anhydride, tetrahydrophthalic anhydride, and hexahydrophthalic anhydride, and ethylenediaminetetraacetic acid in amounts from 0.0005 to 1.0 percent by weight of said cyclic anhydride.

2. The composition of matter of claim 1 wherein the ethylenediaminetetraacetic acid is present in amounts between about 0.001 and 0.1 percent by weight of said cyclic anhydride.

3. A composition of matter stabilized against discoloration comprising a molten cyclic anhydride of a dibasic acid selected from the group consisting of maleic anhydride, phthalic anhydride, succinic anhydride, tetrahydrophthalic anhydride, and hexahydrophthalic anhydride and ethylenediaminetetraacetic acid in an amount between about 0.001 and 0.1 percent by weight of said cyclic anhydride.

4. A process for color stabilizing cyclic anhydrides of dibasic acids against discoloration which comprises incorporating in a cyclic anhydride selected from the group consisting of maleic anhydride, phthalic anhydride, succinic anhydride, tetrahydrophthalic anhydride, and hexahydrophthalic anhydride a color stabilizing amount of ethylenediaminetetraacetic acid.

5. The composition of matter of claim 1 wherein the cyclic anhydride is maleic anhydride.

6. The composition of matter of claim 3 wherein the cyclic anhydride is maleic anhydride.

7. A color stabilized composition of matter comprising a cyclic anhydride of a dibasic acid selected from the group consisting of maleic anhydride, phthalic anhydride, succinic anhydride, tetrahydrophthalic anhydride, and hexahydrophthalic anhydride, and a color stabilizing concentration of ethylenediaminetetraacetic acid.

References Cited in the file of this patent

UNITED STATES PATENTS

| | | |
|---|---|---|
| 2,558,728 | Britton et al. | July 3, 1951 |
| 2,806,861 | Cummings | Sept. 17, 1957 |
| 3,041,251 | Perfetti et al. | June 26, 1962 |